April 5, 1927.  1,623,794
W. KLAMROTH
RUNNING BOARD LUGGAGE CARRIER FOR VEHICLES
Filed July 25, 1923
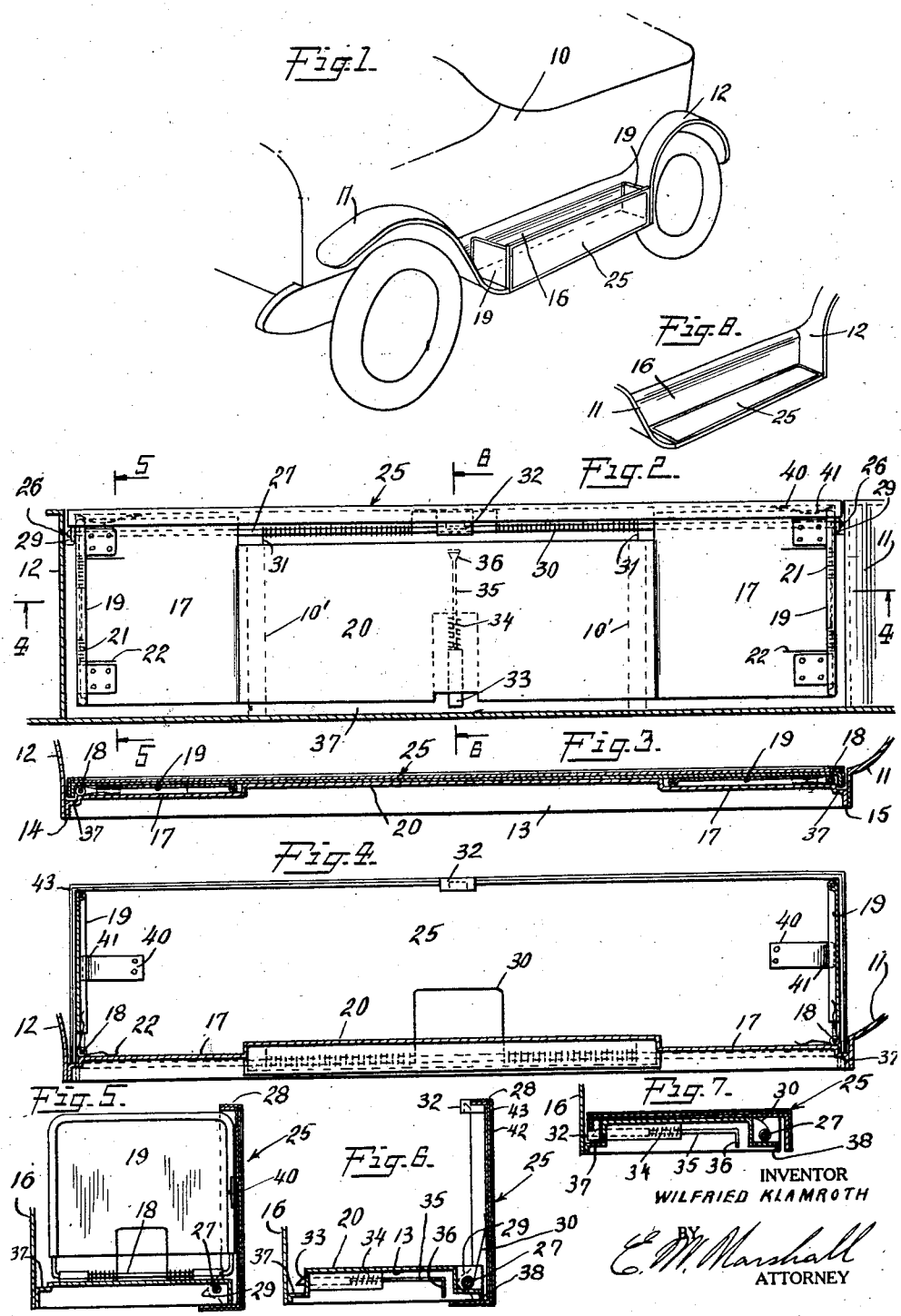
INVENTOR
WILFRIED KLAMROTH
ATTORNEY Patented Apr. 5, 1927.

1,623,794

UNITED STATES PATENT OFFICE.

WILFRIED KLAMROTH, OF NEW YORK, N. Y.

RUNNING-BOARD LUGGAGE CARRIER FOR VEHICLES.

Application filed July 25, 1923. Serial No. 653,625.

This invention relates to luggage carriers for motor vericles and, particularly, to the type of carrier adapted for use on a vehicle running board.

Devices of the type referred to are usually objectionable since they are unsightly and detract from the appearance of the vehicle. Furthermore, such carriers are usually exposed to dust and dirt, often rattle, and require time and considerable ingenuity for their adjustment. Also, in adjusting or putting them into condition for use the person adjusting them soils his hands and clothes.

This invention has for its object to provide a luggage carrier permanently attached to and carried by a vehicle running board but so constructed and arranged as to be entirely concealed when not in use, thereby not detracting from the neat appearance of the running board.

Another object of the invention is to provide a carrier so constructed that the various parts thereof will be entirely concealed and protected from dust and dirt when the carrier is folded and not in use.

Another object of the invention is to provide a carrier so constructed and arranged as to be easily and instantaneously released and automatically adjusted to operative position.

Further objects of the invention will appear from the following specification taken in connection with the drawings, which form a part of this application, and in which—

Fig. 1 is a perspective view of the portion of a motor vehicle showing a running board carrier in open position thereon.

Fig. 2 is a plan view of the carrier showing the cover and the pivoted wings in open position.

Fig. 3 is a longitudinal sectional elevation of the structure shown in Fig. 2 showing the end wings in closed position and the cover in closed position.

Fig. 4 is a longitudinal sectional elevation taken substantially on line 4—4 of Fig. 2.

Fig. 5 is a transverse sectional elevation taken substantially on line 5—5 of Fig. 2.

Fig. 6 is a transverse sectional elevation taken substantially on line 6—6 of Fig. 2.

Fig. 7 is a sectional elevation similar to Fig. 6, but showing the cover in closed position, and Fig. 8 is a detail perspective view showing the carrier in closed position on the running board.

The invention briefly described comprises a frame or base secured to the vehicle frame and, if desired, at its ends to the front and rear fenders and intermediate its end, if desired, to the apron between the body and the frame. This frame has hinged thereto at its ends a pair of wings adapted to swing to a substantially vertical position and along its outer edge there is hinged thereto a longitudinally extending member. This member is adapted when in its closed position to conceal the wings and the base or frame of the carrier and the upper surface of the cover member or longitudinally extending member forms the running board and is preferably finished in the same manner as the standard running board of the vehicle. For instance, this cover member may have a linoleum tread secured thereto. In other words, when the carrier is folded, the running board does not differ in appearance from the other running board or the standard running board of the vehicle. The wings and cover member are preferably resiliently actuated to open position and the cover member is releasably secured in closed position by a latch which is operable by a releasing member disposed beneath the carrier and readily accessible. Further details of the invention will appear from the following description.

In the particular embodiment of the invention illustrated in the drawings, there is shown a motor vehicle 10 having a front fender 11 and a rear fender 12. The frame or base member 13 of the carrier is secured to the vehicle frame by the usual brackets 10'. The base may also be secured at one end 14 to the fender 12 and at the other end 15 to the fender 11. Intermediate its ends the base member 13 may be secured, if desired, to the apron 16 which extends from the body of the vehicle downwardly to the member 13 or in the usual construction extends between the body and the running board.

The base member 13 is preferably formed of sheet metal and has formed therein adjacent its ends depressed portions 17. Each of these depressed portions has pivoted therein a wing 19. Each wing is preferably formed of sheet metal and has three of its edges rolled around a rod 18, this rod extending beyond and across one end of the wing and forming a pivot for the wing. These wings are adapted to fold downwardly into the depressed portions and when so folded the upper surfaces of the wings are flush with the surface of the intermediate portion 20 of the frame 13.

Each of the wings 19 is resiliently actuated to open position by means of a torsion spring 21 mounted on the pivot rod 18 and having its ends 22 engageable with the depressed portions 17 and having its intermediate portion as shown particularly in Fig. 5 engaging the wing.

A cover 25 also preferably of stamped metal is pivotally mounted at its ends 26 on a rod 27 carried by the base member 13 and extending longitudinally thereon as shown in Fig. 2. The cover 25 has formed thereon at all four edges thereof flanges 28, the end flanges having extensions 29 receiving the pivot rod 27 as shown at 26. As shown in Fig. 2, the ends of the rod 27 may be riveted or headed over beyond the extension 29.

The cover 25 is also resiliently actuated to open position by a spring having an intermediate portion 30 engaging the cover and having end portions 31 engaging the base member 13.

The springs 21 and 30 maintain the wings and cover under tension, when closed, and thus avoiding any rattle of these members.

The cover 25 has formed thereon or secured thereto intermediate its ends a latch member 32 engageable by a latch 33 carried by the base member 13 and resiliently actuated to latching position by a spring 34. A rod 35 is secured to the latch 33 and extends rearwardly and downwardly therefrom as shown in Fig. 6, the free end thereof having a knob or button 36 secured thereto to facilitate actuation of the latch. This button as will be seen is positioned near the outer edge of the frame member and is thereby readily accessible.

As shown in Figs. 3, 6 and 7, the flanges formed on the free edges of the cover member 25 are adapted to enter depressions 37 in the frame member 13 and thereby be positioned in close proximity to the apron 16 and fenders 11 and 12. As also shown in these figures, the flange at the opposite edge of the member 25 is adapted to engage a stop 38 formed on the member 13 when the cover is swung to open position.

If desired, non-positive stops may be provided for holding the wings 19 in open position and such stops are shown in Figs. 2 and 4 at 40. These stops consist of resilient strips secured to the inner surface of the cover member 25 and each strip has a projection 41 adapted to non-positively retain the wing in open position.

In order to add to the finished appearance of the outer surface of the cover member and to give to this surface the appearance of a running board, a strip of linoleum 42 may be secured thereto and a border of metallic beading may be secured to the flanges of the cover member and extend over the edges of the linoleum.

From the foregoing description and from the illustration in the drawings, it will be seen that the luggage carrier disclosed does not detract in any way from the neat appearance of the vehicle and the cover of the luggage carrier conceals all the parts thereof and itself resembles and has the appearance of an ordinary running board. The releasing latch is readily accessible and when released the cover of the carrier will swing upwardly thereby releasing the end wings which will also swing upwardly to operative position. When the carrier is to be closed, the wings are swung downwardly and the cover member is then swung down to closed position in which position it will be automatically latched.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a vehicle, a frame, front and rear fenders carried thereby, a frame member secured to the vehicle frame, wings hinged to the end portions of said frame member and adapted to swing upwardly therefrom and a cover hinged to the outer or free edge of the frame member and adapted to swing upwardly therefrom, said cover having flanges for enclosing the inner edge and ends of said frame member, and the frame member having channels for receiving said flanges, the cover when closed forming the running board of the vehicle.

2. In a vehicle, a frame, front and rear fenders carried thereby, a frame member secured to the vehicle, wings hinged to the end portions of said frame member and adapted to swing upwardly therefrom and a cover hinged to the outer or free edge of the frame member and adapted to swing upwardly therefrom, said cover having flanges for enclosing the inner and outer edges and ends of said frame member, the cover when closed forming the running board of the vehicle, resilient means for swinging said wings and cover upwardly, a latch for holding said cover in closed position, and latching means, automatically engageable with the wings when the wings are swung to elevated position, for retaining the wings and frame member in open position.

3. In a vehicle, a frame, front and rear fenders carried thereby, a frame member secured to said vehicle frame and disposed between said fenders, wings hinged to the end portions of said frame member and adapted to swing upwardly therefrom and a cover hinged to the outer or free edge of the frame member and adapted to swing upwardly therefrom, said cover having flanges for enclosing the inner edge and ends of said frame member, the cover when closed forming the running board of the vehicle, resilient means for swinging said wings and cover upwardly, a latch for holding said cover in closed position, said latch including a releasing member extending below the frame, and latching means, automatically engageable with the wings when the wings are swung to elevated position, for retaining the wings and frame member in open position.

4. In a vehicle, front and rear fenders, a base member having its ends disposed adjacent said fenders and having depressed end portions, wings hinged to said depressed end portions and received thereby when folded, a cover member hinged to the outer edge of the member and adapted, when closed, to conceal said member and wings, said cover member having flanges on its side and end edges and said base member having channels for receiving the inner and end flanges of the cover when the cover is closed.

In witness whereof, I have hereunto set my hand this 23rd day of July, 1923.

WILFRIED KLAMROTH.